US00RE34376E

United States Patent [19]

Branback

[11] E Patent Number: Re. 34,376

[45] Reissued Date of Patent: Sep. 14, 1993

[54] CABLE DISPENSER

[76] Inventor: Robert J. Branback, P.O. Box 2354, Kingsford, Mich. 49801

[21] Appl. No.: 704,131

[22] Filed: Aug. 22, 1990

Related U.S. Patent Documents

Reissue of:

[64] Patent No.: 4,765,560
Issued: Aug. 23, 1988
Appl. No.: 58,167
Filed: Jun. 4, 1987

[51] Int. Cl.[5] ..... B65H 49/20; B65H 49/28

[52] U.S. Cl. ..... 242/129

[58] Field of Search ..... 242/129, 129.5, 129.7, 242/129.71, 129.8, 130, 130.1, 134, 129.72, 139, 140, 110, 110.3, 115, 127

[56] References Cited

U.S. PATENT DOCUMENTS

| | | | |
|---|---|---|---|
| Re. 30,727 | 9/1981 | Chong . | |
| 80,664 | 8/1868 | Porter et al. | 242/110 |
| 485,109 | 10/1892 | Morrow . | |
| 701,317 | 6/1902 | English | 242/110.3 |
| 764,389 | 7/1904 | Stambaugh . | |
| 1,102,128 | 6/1914 | Bastian . | |
| 1,147,680 | 7/1915 | Crawford . | |
| 1,465,818 | 8/1923 | Gunn . | |
| 1,488,541 | 4/1924 | Hasen . | |
| 2,491,585 | 12/1949 | Sammons . | |
| 2,580,129 | 12/1951 | Rich . | |
| 2,990,135 | 6/1961 | Croteau . | |
| 3,052,425 | 9/1962 | Reed . | |
| 3,118,634 | 1/1964 | Schumake . | |
| 3,127,127 | 3/1964 | Kohn . | |
| 3,136,496 | 6/1964 | McMartin . | |
| 3,464,647 | 9/1969 | Jacobi . | |
| 3,556,431 | 1/1971 | Freitag . | |
| 3,593,943 | 7/1971 | Collmann . | |
| 3,764,086 | 10/1973 | Garzonio . | |
| 3,837,597 | 9/1974 | Bourhenne . | |
| 4,089,486 | 5/1978 | Carter . | |
| 4,112,711 | 9/1978 | Tripp . | |
| 4,184,647 | 1/1980 | Rourke . | |
| 4,456,198 | 6/1984 | Kosch . | |
| 4,465,246 | 8/1984 | Kosch . | |
| 4,471,921 | 9/1984 | Corbin . | |
| 4,508,291 | 4/1985 | Kosch . | |

FOREIGN PATENT DOCUMENTS

| | | | |
|---|---|---|---|
| 175725 | 2/1922 | United Kingdom | 242/127 |

*Primary Examiner*—Stanley N. Gilreath
*Attorney, Agent, or Firm*—Willian Brinks Olds Hofer Gilson & Lione

[57] ABSTRACT

A device for unwinding a coil of cable comprising: a base having a hole; a radial bearing fixedly mounted in the hole in the base, the bearing comprising an inner race and an outer race, the inner race circumscribing a hole; a shaft having a means for engaging the inner race of the bearing while the shaft passes through the hole circumscribed by the inner race of the bearing; a cable support having a hole through which passes the shaft, the cable support being seated on the bearing in engagement with the inner race of the bearing so that the cable support can rotate freely with respect to the base to allow cable to be unwound from a coil of cable which is placed on the cable support, the coil of cable being placed on the case support so that the shaft passes through the center of the coil; and a cable guide which is mounted on the shaft by means of a hole in the cable guide, the cable guide being mounted on the shaft after the coil of cable has been placed on the cable support and being mounted so that it abuts the coil of cable, holds the coil in place and guides the cable as it is unwound.

16 Claims, 2 Drawing Sheets

FIG. 3
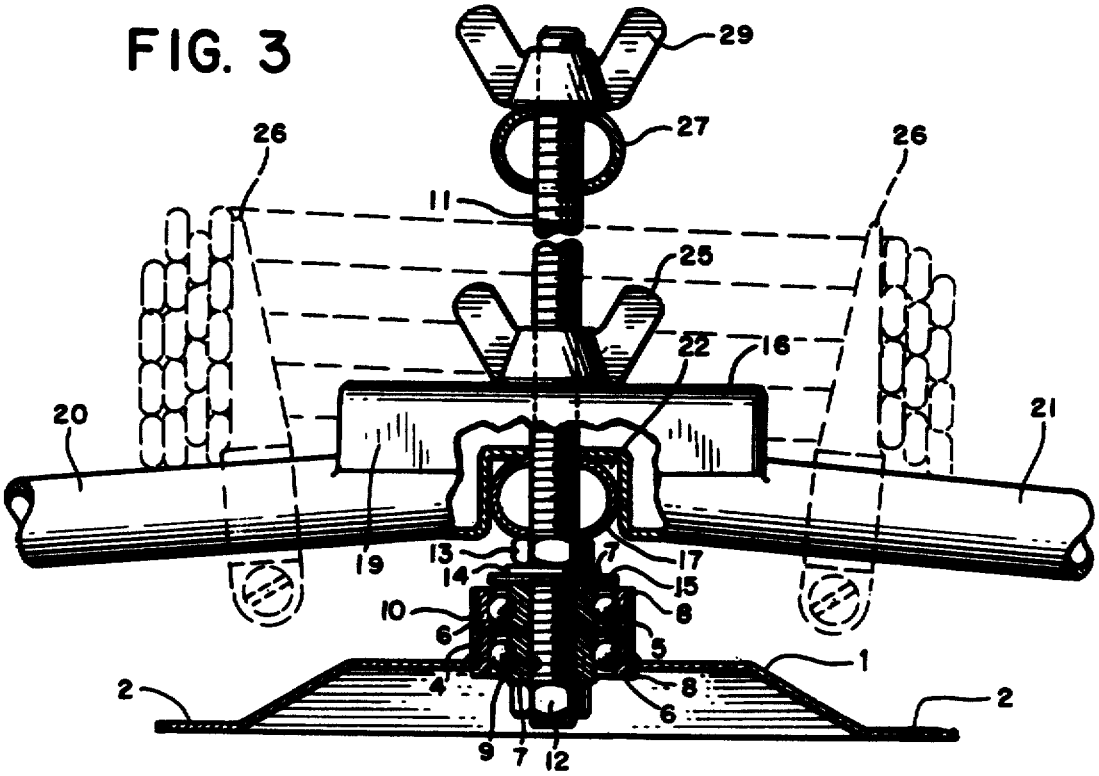
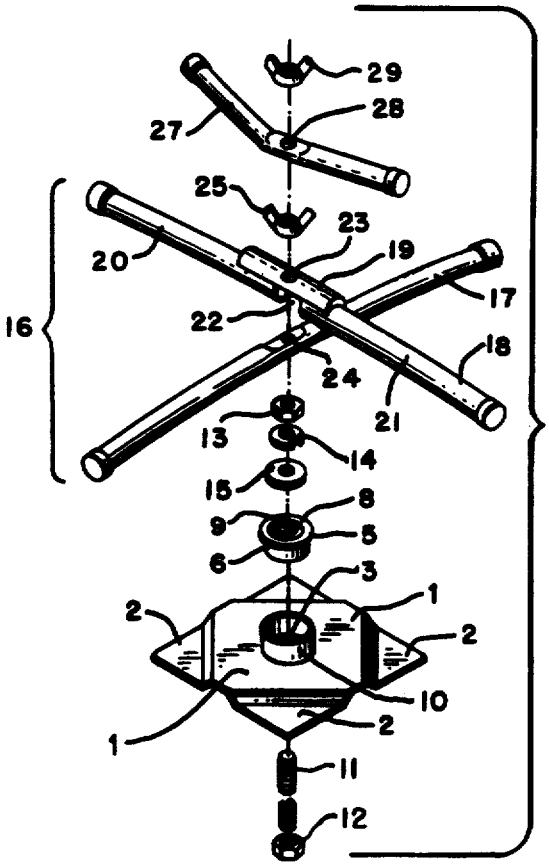
FIG. 4

CABLE DISPENSER

Matter enclosed in heavy brackets [ ] appears in the original patent but forms no part of this reissue specification; matter printed in italics indicates the additions made by reissue.

BACKGROUND OF THE INVENTION

The present invention relates to the general field of unwinding devices. Specifically the invention relates to apparatus for dispensing cable from coils of such cable, particularly to apparatus which are used for dispensing electrical cable. Numerous such devices are known in the art.

BRIEF DESCRIPTION OF THE INVENTION

It is an object of the present invention to provide a cable dispenser which is simple to use. It is also an object of the invention to provide a cable dispenser that will permit cable to be readily unwound from a coil of cable. Another object of the invention is to provide a cable dispenser having means for holding a coil of cable in place on the dispenser. It is also an object of the invention to provide a cable dispenser which is designed to prevent the tangling or spinning off of cable during unwinding of the cable. It is a further object of the invention to provide a cable dispenser that can be transported from place to place. It is yet a further object of the invention to provide a cable dispenser that can be conveniently stored. These and other objects are attained by the present invention as is apparent from the following description.

The invention comprises a device for unwinding a coil of cable, the device comprising a base, a radial bearing, a shaft, a cable support and a cable guide. The base has a hole in which the radial bearing is fixedly mounted. The bearing comprises an inner race and an outer race, the inner race circumscribes a hole. The shaft has a means for engaging the inner race of the bearing while the shaft passes through the hole circumscribed by the inner race of the bearing. The cable support has a hole through which passes the shaft, and the cable support is seated on the bearing in engagement with the inner race of the bearing so that the cable support can rotate freely with respect to the base to allow cable to be readily unwound from a coil of cable which is placed on the cable support, the coil of cable being placed on the cable support so that the shaft passes through the center of the coil. In one embodiment described below, the cable support is designed so that it can be compacted for more convenient storage. The cable guide is mounted on the shaft after the coil of cable has been placed on the cable support by means of a hole in the cable guide. The cable guide is mounted so that it abuts the coil of cable, holds the coil in place and guides the cable as it is unwound. Thus, the cable is readily unwound without tangling or spinning off. The cable guide can also function as a handle which can be used to transport the cable dispenser.

In an especially preferred embodiment, the device comprises two radial bearings surrounded by a sleeve, instead of a single radial bearing. The use of two bearings is preferred because it provides greater lateral stability to the shaft. The first radial bearing comprises an inner race and outer race; the inner race of the first bearing circumscribes a hole. The first bearing is fixedly mounted in the hole in the base. The sleeve is mounted so that it surrounds the outer race of the first bearing and so that one end of the sleeve abuts the base. The second radial bearing also comprises an inner race and an outer race; the inner race of the second bearing circumscribes a hole. The second bearing is mounted in the sleeve so that the sleeve also surrounds the outer race of the second bearing. The shaft has a means for engaging the inner race of the first bearing while the shaft passes through the holes circumscribed by the inner races of the first and second bearings. The cable support is mounted in engagement with the shaft and is seated on the second bearing in engagement with the inner race of that bearing so that the cable support can rotate freely with respect to the base to allow cable to be unwound.

BRIEF DESCRIPTION OF THE DRAWINGS

FIG. 3 is a front sectional view of the cable dispenser.
FIG. 4 is an exploded view of the cable dispenser.

DETAILED DESCRIPTION OF THE PRESENTLY PREFERRED EMBODIMENT

Figure 1:
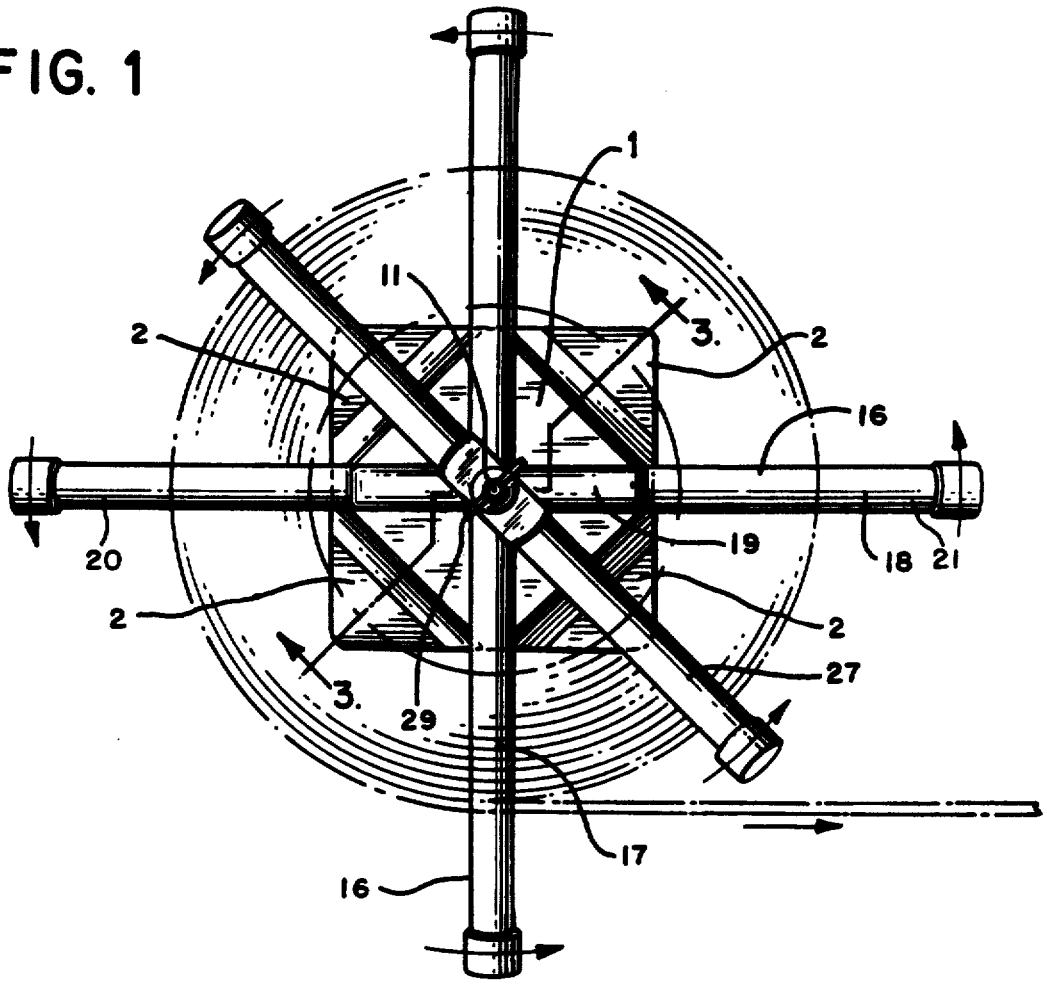
FIG. 1 is a top view of the cable dispenser.
Figure 2:
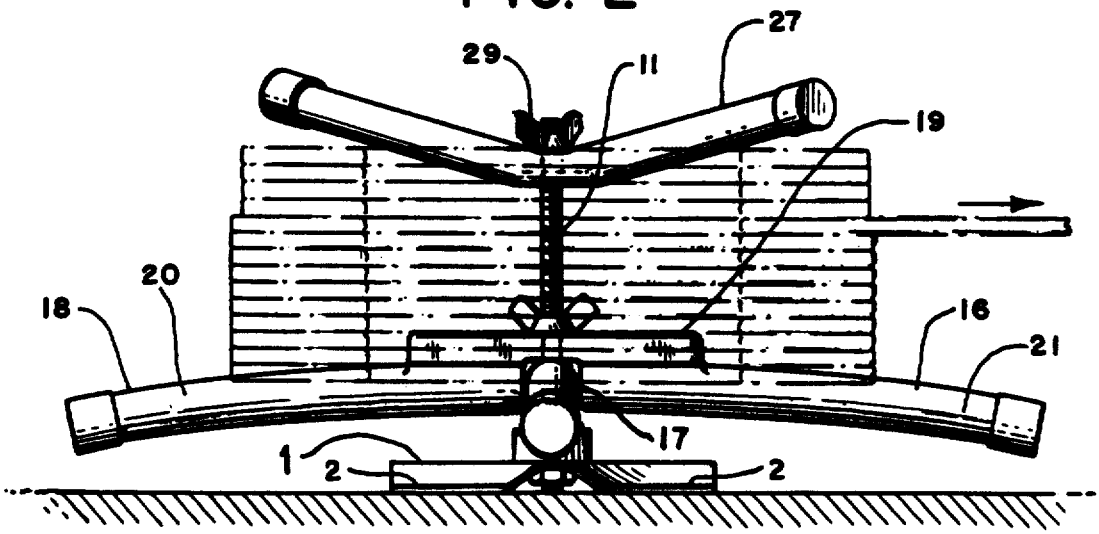
FIG. 2 is a front view of the cable dispenser.

Referring to the figures, the base 1 consists of a single approximately square piece of aluminum. Alternatively, the base can be made of any other lightweight metal. The corners of the base are bent downward and flattened to form feet 2 for the base. In the center of the base is a hole 3.

Two bearings 4, 5 are mounted on the base. The bearings are radial ball bearings which are also capable of sustaining a thrust load and which do function primarily as axial or thrust bearings during operation of the dispenser. Each bearing comprises an outer race 6 and an inner race 7. The outer race has a flange 8. The inner race circumscribes a hole 9.

The bearing 4 is mounted on the base by being pushed into the hole 3 from the bottom of the base until the flange 8 on the outer race of bearing 4 comes into contact with the bottom of the base. Since the hole in the base is slightly smaller in diameter than the diameter of the outer race of bearing 4, this mounting procedure fixes bearing 4 firmly in place.

Next a metal sleeve 10 is placed around the part of the outer race of bearing 4 which protrudes above the base so that one end of the sleeve is in contact with the base. The sleeve is a cylindrical piece of metal (such as a transverse section of pipe) having a diameter chosen so that the sleeve fits very snugly around the outer race of bearing 4.

Next, bearing 5 is pushed into sleeve 10 until the flange of the outer race of bearing 5 comes into contact with the end of sleeve 10 not in contact with the base. Thus, the height of the sleeve must be chosen so that the two bearings can be mounted as described without any impediment of the rotation of the inner races of the two bearings. Also, as is apparent, the hole circumscribed by the inner race of bearing 4 and the hole circumscribed by the inner race of bearing 5 will be in alignment when the hearings are mounted as described.

Although the use of two bearings mounted as just described is preferred because this arrangement provides greater lateral stability to the shaft, the results of the invention can also be achieved by the use of one bearing only. When one bearing is used, it should be mounted as described for bearing 4. No sleeve is used, and the cable support 16 is mounted in engagement with the inner race of bearing 4.

The shaft 11 is a threaded metal rod. A nut 12 is screwed onto one end of the shaft, and the shaft is then passed through the hole circumscribed by the inner races of bearings 4 and 5 from the bottom of the base until the nut 12 abuts the bottom of the inner race of bearing 4.

Nut 13 is screwed onto the other end of the shaft and is screwed down until it tightly abuts the inner race of bearing 5. Thus, the shaft is held firmly in engagement with the inner races of bearings 4 and 5 and can freely rotate.

Seated on top of nut 13 is the cable support 16 on which, in operation, is placed on the coil of cable to be unwound. Washers 14, 15 may optionally be used as spacers between nut 13 and cable support 16 if needed to allow for free rotation of the cable support.

The cable support comprises two arms 17, 18 which form a cross. Arm 17 is a single piece of aluminum pipe. Arm 18 comprises one piece of aluminum pipe 19 attached to two other pieces of aluminum pipe 20, 21 in such a manner that a gap 22 is left between pieces 20 and 21, the gap being spanned by piece 19. Gap 22 is slightly wider than the diameter of arm 17 so that arm 18 can span arm 17 at the point of intersection of the two arms of the cross. Piece 19 is attached to pieces 20 and 21 by soldering. Other means of attachment could be used. Also, it is possible to form arm 18 by bending a single piece of aluminum pipe. Aluminum pipe is used because it is lightweight, but other metal pipe or solid pieces of metal could be used.

The shaft passes through holes 23, 24 in the center of the arms of the cable support. The shaft passes through the cable support at the point of intersection of the two arms.

Located on the shaft above the cable support is a wing nut 25 which is tightened to hold the cable support in engagement with the shaft and with the inner race of bearing 5 (through nut 13) so that the cable support can freely rotate relative to the base.

When the cable dispenser is not in operation (as during storage or when it is being transported from place to place), the wing nut 25 can be loosened and arm 18 lifted and rotated so that it is substantially parallel to arm 17. Arm 18 is then lowered so that it is seated on top of arm 17. Arm 18 is then lowered so that it is seated on top of arm 17. Wing nut 25 is next tightened to hold the arms in place, and the cable dispenser is ready to be transported or stored.

The arms of the cable support may also optionally have attached sliding clamps 26. These clamps function to abut the coil of cable on the inside of the coil to prevent shifting of the coil during unwinding.

Cable guide 27 is a single arm having the ends of the arm bent upward relative to the center of the arm when the cable guide is mounted on the shaft. The cable guide is made from a single piece of aluminum pipe, but other metal pipes and solid metals may be used. The shaft passes through a hole 28 in approximately the center of the cable guide.

The cable guide is mounted on the shaft after a coil of cable has been placed on the cable support for unwinding. The cable guide is mounted so that it abuts the top of the coil of cable. The function of the cable guide is to hold the coil of cable in place by abutting against the top of the coil and to prevent the cable from tangling or spinning off the top of the dispenser while the cable is being unwound. The cable guide can also function as a handle whereby the dispenser may be transported from place to place.

In operation, a coil of cable is placed on the cable support so that the shaft passes through the approximate center of the coil of cable. Then the cable guide is placed on the shaft and lowered until it abuts the coil of cable. The cable guide is held tight against the coil of cable by means of a wing nut 19 which is tightened. If the optional sliding clamps 26 are being used, they are next engaged so as to abut the inside of the coil of cable. The cable is then unwound by simply pulling on the free end of the cable.

Although the invention has been described with respect to specific embodiments, it is not intended that the invention be limited to these embodiments. Those skilled in the art will appreciate that other equivalent means of practicing the invention exist.

I claim:

1. A device for unwinding a coil of cable comprising:
   - a base having a hole;
   - a first radial bearing fixedly mounted in the hole in the base, the first bearing comprising an inner race and an outer race, the inner race circumscribing a hole;
   - a sleeve mounted so that it surrounds the outer race of the first bearing and so that one end of the sleeve abuts the base;
   - a second radial bearing mounted in the sleeve, the second bearing comprising an inner race and an outer race, the inner race circumscribing a hole, the second bearing being mounted so that the sleeve surrounds the outer race of the second bearing;
   - a shaft having a means for engaging the inner race of the first bearing while the shaft passes through the holes circumscribed by the inner races of the first and second bearings;
   - a cable support having a hole through which passes the shaft, the cable support being mounted in engagement with the shaft and seated on the second bearing in engagement with the inner race of that bearing so that the cable support can rotate freely with respect to the base to allow cable to be unwound from a coil of cable which is placed on the cable support, the coil of cable being placed on the cable support so that the shaft passes through the center of the coil; and
   - a cable guide which is mounted on the shaft by means of a hole in the cable guide, the cable guide being mounted on the shaft after the coil of cable has been placed on the cable support and being mounted so that it abuts the coil of cable, holds the coil in place and guides the cable as it is unwound.

2. The device of claim 1 wherein the shaft is a threaded metal rod.

3. The device of claim 1 wherein the base is made of metal.

4. The device of claim 1 wherein the cable support comprises a first arm and a second arm which form a cross.

5. The device of claim [3] *4* wherein the first arm comprises three pieces of aluminum pipe assembled so that one piece spans a gap between the other two pieces and is attached to the other two pieces, the gap being slightly wider than the diameter of the second arm.

6. The device of claim 4 further comprising a plurality of sliding clamps attached to the arms of the cable support which can slide along the arms of the cable support until they abut the coil of cable to hold the coil in place.

7. The device of claim 1 wherein the cable guide is a single arm made of aluminum pipe having the ends bent upward relative to the center of the arm when the cable guide is mounted on the shaft.

8. The device of claim 5 wherein the cable guide is a single arm made of aluminum pipe, having the ends bent upward relative to the center of the arm when the cable guide is mounted on the shaft.

9. The device of claim 8 wherein the shaft is a threaded metal rod.

10. The device of claim 9 wherein the base is made of metal.

11. The device of claim 10 further comprising a plurality of sliding clamps attached to the arms of the cable support which can slide along the arms of the cable support until they abut the coil of cable to hold the coil in place.

12. A device for unwinding a coil of cable comprising:

a metal base having a hole;

a first radial bearing mounted in the hole in the base, the bearing comprising an inner race and an outer race, the outer race having a flange, and the inner race circumscribing a hole, the bearing being mounted on the base so that the flange abuts the bottom of the base and so that the outer race protrudes partially above the top of the base;

a sleeve mounted so that it surrounds the portion of the outer race of the first bearing which protrudes above the base and so that one end of the sleeve abuts the base;

a second radial bearing comprising an inner race and an outer race, the outer race having a flange and the inner race circumscribing a hole, the second bearing being mounted in the sleeve so that the sleeve surrounds the outer race of the second bearing and so that the flange on the outer race of the second bearing abuts the end of the sleeve not abutting the base;

a threaded metal rod which passes through the holes circumscribed by the inner races of the first and second bearings, the rod having a nut screwed thereon which engages the bottom of the inner race of the first bearing;

a cable support comprising a first and a second arm which form a cross, the first arm comprising three pieces of aluminum pipe assembled so that one piece spans a gap between the other two pieces and is attached to the other two pieces, the gap being slightly wider than the diameter of the second arm, the two arms having holes at their point of intersection through which passes the rod, the cable support being mounted in engagement with the rod and seated on the second bearing in engagement with the inner race of that bearing so that the cable support can rotate freely with respect to the base to allow cable to be unwound from a coil of cable which is placed on the cable support, the coil of cable being placed on the cable support so that the shaft passes through its center;

a cable guide comprising a single piece of aluminum pipe having the ends bent upward relative to the center of the piece of pipe when the cable guide is mounted on the shaft, the cable guide being mounted on the shaft by means of a hole in the cable guide after the coil of cable has been placed on the cable support and being mounted so that it abuts the coil of cable, holds the coil in place and guides the cable as it is unwound.

13. A device for unwinding a coil of cable comprising:

a metal base having a hole;

a radial bearing fixedly mounted in the hole in the base, the bearing comprising an inner race and an outer race, the inner race circumscribing a hole;

a threaded metal rod that passes through the hole circumscribed by the inner race of the bearing, the rod having a means for engaging the inner race of the bearing;

a cable support comprising a first and a second arm which form a cross, the first arm comprising three pieces of aluminum pipe assembled so that one piece spans a gap between the other two pieces and is attached to the other two pieces, the gap being slightly wider than the diameter of the second arm, the two arms having holes at their point of intersection through which passes the rod, the cable support being mounted in engagement with the rod and seated on the bearing in engagement with the inner race of the bearing so that the cable support can rotate freely with respect to the base to allow cable to be unwound from a coil of cable which is placed on the cable support, the coil of cable being placed on the cable support so that the rod passes through its center;

a cable guide comprising a single piece of aluminum pipe having the ends bent upward relative to the center of the piece of pipe when the cable guide is mounted on the rod, the cable guide being mounted on the rod by means of a hole in the cable guide after the coil of cable has been placed on the cable support and being mounted so that it abuts the coil of cable, holds the coil in palce and guides the cable as it is unwound.

14. The device of claim 13 further comprising a plurality of sliding clamps attached to the arms of the cable support which can slide along the arms of the cable support until they abut the coil of cable to hold the coil in place.

*15. A cable dispenser which is configurable in both a compact configuration for storage and an extended configuration for supporting and unwinding a coil of cable, comprising:*

*a base;*

*a central rod supported by the base and substantially perpendicular to the base;*

*a cable support supported above the base on the central rod and rotatable relative to the base,*

*said cable support comprising a plurality of arms, at least a first of said arms being rotatable about said central rod between a first storage position and a second use portion, wherein said first arm is substantially parallel to a second of said arms when in said storage position and is substantially nonparallel to said second arm when in said use position; and*

*a cable guide supported on said central rod above said cable support and spaced from the cable support sufficiently to define a region for receiving the cable to be dispensed.*

*16. A cable dispenser which is configurable in both a compact configuration for storage and an extended configuration for supporting and unwinding a coil of cable, comprising:*

*a base;*

*a central rod supported by the base and substantially perpendicular to the base;*

*a radial bearing having inner and outer races rotatable to one another, wherein one of said races is secured to said base and the other of said races is secured to said central rod, thereby rotatably attaching said central rod to the base;*

*a cable support supported above the base on the central rod and rotatable relative to the base;*

*said cable support comprising a plurality of arms, at least a first of said arms being rotatable about said central rod between a first storage position and a second use position, wherein said first arm is substantially parallel to a second of said arms when in said storage position and is substantially nonparallel to said second arm when in said use position;*

*a cable support guide on said central rod above said cable support and spaced from the cable support sufficiently to define a region for receiving the cable to be dispensed.*

* * * * *

UNITED STATES PATENT AND TRADEMARK OFFICE

CERTIFICATE OF CORRECTION

PATENT NO. : Re. 34,376
DATED : September 14, 1993
INVENTOR(S) : Robert J. Branback It is certified that error appears in the above-indentified patent and that said Letters Patent is hereby corrected as shown below:

In column 2, line 62, delete "hearings" and substitute therefor --bearings--.

In column 3, lines 47 and 48, delete "Arm 18 is then lowered so that it is seated on top of arm 17."

Column 6, line 37;

In claim 13, line 34, delete "palce" and substitute therefor --place--.

Signed and Sealed this
Twelfth Day of July, 1994

*Attest:*

Bruce Lehman

BRUCE LEHMAN

*Attesting Officer*

*Commissioner of Patents and Trademarks*